(12) United States Patent
Strangman

(10) Patent No.: US 7,150,926 B2
(45) Date of Patent: Dec. 19, 2006

(54) THERMAL BARRIER COATING WITH STABILIZED COMPLIANT MICROSTRUCTURE

(75) Inventor: Thomas E. Strangman, Prescott, AZ (US)

(73) Assignee: Honeywell International, Inc., Morristown, NJ (US)

(*) Notice: Subject to any disclaimer, the term of this patent is extended or adjusted under 35 U.S.C. 154(b) by 459 days.

(21) Appl. No.: 10/621,981

(22) Filed: Jul. 16, 2003

(65) Prior Publication Data

US 2005/0013994 A1    Jan. 20, 2005

(51) Int. Cl.
B32B 9/00    (2006.01)

(52) U.S. Cl. .............. 428/702; 416/241 R; 416/241 B; 428/688; 428/689

(58) Field of Classification Search ................ 428/701, 428/702, 697, 699; 416/241 B
See application file for complete search history.

(56) References Cited

U.S. PATENT DOCUMENTS

| | | | |
|---|---|---|---|
| 4,321,311 A | 3/1982 | Strangman | |
| 4,401,697 A | 8/1983 | Strangman | |
| 4,405,659 A | 9/1983 | Strangman | |
| 4,880,614 A | 11/1989 | Strangman et al. | |
| 4,914,794 A | 4/1990 | Strangman | |
| 4,916,022 A | 4/1990 | Solfest et al. | |
| 5,073,433 A | 12/1991 | Taylor | |
| 5,238,752 A | 8/1993 | Duderstadt et al. | |
| 5,514,482 A | 5/1996 | Strangman | |
| 5,562,998 A | 10/1996 | Strangman | |
| 5,630,314 A | 5/1997 | Kojima et al. | |
| 5,683,825 A | 11/1997 | Bruce et al. | |
| 5,830,586 A | 11/1998 | Gray et al. | |
| 6,103,386 A | 8/2000 | Raybould et al. | |
| 6,106,959 A * | 8/2000 | Vance et al. | 428/623 |
| 6,183,884 B1 | 2/2001 | Rickerby | |
| 6,187,453 B1 | 2/2001 | Maloney | |
| 6,203,927 B1 | 3/2001 | Subramanian et al. | |
| 6,296,945 B1 | 10/2001 | Subramanian | |
| 6,395,343 B1 | 5/2002 | Strangman | |
| 6,482,537 B1 | 11/2002 | Strangman et al. | |
| 6,733,908 B1 * | 5/2004 | Lee et al. | 428/702 |
| 6,924,040 B1 * | 8/2005 | Maloney | 428/472 |
| 2005/0064213 A1 * | 3/2005 | Subramanian et al. | 428/469 |

* cited by examiner

*Primary Examiner*—Jennifer C. McNeil
*Assistant Examiner*—Elizabeth D. Ivey
(74) *Attorney, Agent, or Firm*—Ingrassia Fisher & Lorenz

(57) ABSTRACT

A thermal barrier coating for a gas turbine component includes a bond coating layer, at least a first segmented columnar ceramic layer on the bond coating layer, and a particulate structure-stabilizing material disposed within a plurality of segmentation gaps within the columnar ceramic layer(s). The thermal barrier coating may further comprise, a second segmented columnar ceramic layer of yttria stabilized hafnia on the first segmented columnar ceramic layer, and an outer, continuous, non-segmented sealant layer covering the yttria stabilized hafnia layer to prevent ingress of extraneous materials into the segmentation gaps. Methods for depositing a thermal barrier coating on a substrate are also disclosed.

28 Claims, 4 Drawing Sheets

THERMAL BARRIER COATING WITH STABILIZED COMPLIANT MICROSTRUCTURE

BACKGROUND OF THE INVENTION

The present invention generally relates to a thermal barrier coating for a gas turbine component, and more specifically to a thermal barrier coating having at least one ceramic layer having a segmented columnar microstructure and exhibiting increased stability. The present invention also relates to methods for coating a substrate with a thermal barrier coating having at least one segmented columnar ceramic layer.

In order to increase the efficiency of gas turbine engines, higher operating temperatures are now being used. However, the ability to operate at increasingly high gas temperatures within the engine is limited by the ability of the superalloy components to maintain their mechanical strength and integrity following continued exposure to the heat, oxidation, and corrosive effects of the impinging gas. It is known in the art to apply a protective thermal barrier coating to superalloy substrates to provide thermal insulation of the substrate as well as to inhibit erosion, and oxidation and hot gas corrosion of the substrate.

Prior art compliant thermal barrier coatings typically include an outer ceramic layer having a segmented columnar microstructure. Segmentation gaps between the individual columns of the outer ceramic layer imbue the characteristic of compliancy, and allow the columnar layer to expand and contract without developing stresses that may cause spalling. However, following exposure to temperatures in excess of about 2000° F., sintering of the multi-grained columns or columnar grains may close segmentation gaps between the columns. Once the gaps become closed, the ceramic layer can no longer accommodate the large ceramic-substrate thermal expansion mismatch, and the thermal barrier coating tends to spall leading to increased heat transfer into the component.

U.S. Pat. No. 6,203,927 B1 to Subramanian et al. discloses a thermal barrier coating having a sintering inhibiting material disposed on columns of a columnar ceramic layer. U.S. Pat. No. 6,296,945 B1 to Subramanian discloses a base columnar thermal barrier coating having a ceramic oxide sheath material thereon, wherein the sheath material is the product of a reaction between an applied precursor oxide material and material of the base columnar thermal barrier coating.

U.S. Pat. No. 6,103,386, to Strangman, discloses a thermal barrier coating having a columnar grained ceramic (e.g., zirconia) layer, and a sheath of bond inhibitor, such as alumina, disposed between the columnar grains, whereby the bond inhibitor imparts resistance to sintering of the columnar grains. However, the solubility of alumina in zirconia, or the melting of alumina and zirconia, limits the maximum temperature capability of such thermal barrier coatings to about 3000° F. In contrast, more advanced gas turbine engines require significantly higher surface temperature capability, namely up to about 3400° F.

As can be seen, there is a need for a thermal barrier coating having increased stability and integrity of columnar ceramic layers at higher operating temperatures. There is a further need for a thermal barrier coating which prevents the penetration or ingress of extraneous materials into segmentation gaps within the columnar ceramic layer(s). There is also a need for a stable thermal barrier coating which allows for the formation of effusion holes through the coating and the underlying substrate or component with no, or minimal, interfacial cracking or spalling of the thermal barrier coating.

SUMMARY OF THE INVENTION

In one aspect of the present invention, a thermal barrier coating comprises a bond coating layer disposed on a substrate, and a segmented columnar ceramic layer disposed on the bond coating layer. The segmented columnar ceramic layer comprises at least one of a stabilized zirconia layer, and a stabilized hafnia layer. The hafnia and zirconia layers typically comprise a stabilizing oxide component, such as yttria, to provide, e.g., an yttria stabilized zirconia layer, and an yttria stabilized hafnia layer. The segmented columnar ceramic layer includes a plurality of segmentation gaps interposed between a plurality of columns. A structure-stabilizing material is disposed within the plurality of segmentation gaps between adjacent columns of the columnar microstructure.

In another aspect of the present invention, there is provided a thermal barrier coating having a bond coating layer disposed on a substrate surface, a layer of cubic yttria stabilized zirconia on the bond coating layer. The layer of cubic yttria stabilized zirconia may comprise from about 7 to 40 mole % yttria and from about 60 to 93 mole % zirconia. The layer of cubic yttria stabilized zirconia may have a thickness in the range of from about 5 to 60 mils. The thermal barrier coating further includes a layer of cubic yttria stabilized hafnia disposed on the yttria stabilized zirconia layer. The layer of cubic yttria stabilized hafnia may have a thickness in the range of from about 5 to 60 mils. Each of the layer of cubic yttria stabilized hafnia and the layer of cubic yttria stabilized zirconia has a columnar microstructure, and a plurality of segmentation gaps within the columnar microstructure. The segmentation gaps are oriented substantially orthogonal to the substrate surface. The thermal barrier coating further includes a structure-stabilizing material within the segmentation gaps. The structure-stabilizing material typically comprises particles of an yttrium aluminum oxide, or a mixture of alumina and yttrium aluminum oxides, having a diameter in the range of from about 0.1 to 2 microns. The thermal barrier coating may still further include an outer sealant layer on the yttria stabilized hafnia layer. The outer sealant layer may comprise a continuous, non-segmented coating on the columnar microstructure, such that the sealant layer seals the segmentation gaps within the cubic yttria stabilized hafnia layer. The sealant layer may comprise a cubic stabilized zirconia or a cubic stabilized hafnia, such as cubic yttria stabilized zirconia and cubic yttria stabilized hafnia.

In another aspect of the present invention, an article of manufacture for a gas turbine engine comprises a superalloy substrate, a bond coating layer disposed on the substrate, a first segmented columnar ceramic layer comprising yttria stabilized zirconia disposed on the bond coating layer, and a second segmented columnar ceramic layer comprising yttria stabilized hafnia disposed on the first columnar ceramic layer. Each of the first and second columnar ceramic layers has a plurality of segmentation gaps therein.

The segmentation gaps are interspersed with, and define, a plurality of columns within the first and second segmented columnar ceramic layers. A structure-stabilizing material is disposed within the segmentation gaps. The structure-stabilizing material maintains the integrity of the plurality of columns within the first and second columnar ceramic layers. An outer, continuous, non-segmented ceramic sealant layer is disposed on the second columnar ceramic layer to prevent penetration of extraneous materials into the segmentation gaps.

In another aspect of the present invention, a method of forming a thermal barrier coating on a substrate comprises providing the substrate, depositing a bond coating layer on the substrate surface, depositing a first segmented columnar ceramic layer of yttria stabilized zirconia on the bond coating layer, depositing a second segmented columnar ceramic layer of yttria stabilized hafnia on the first columnar ceramic layer, and depositing a structure-stabilizing material within a plurality of segmentation gaps of the first and second columnar ceramic layers. The first and second segmented columnar ceramic layers are deposited such that the first and second columnar ceramic layers each have a plurality of columns, wherein the columns define the segmentation gaps.

These and other features, aspects and advantages of the present invention will become better understood with reference to the following drawings, description, and claims.

DETAILED DESCRIPTION OF THE INVENTION

Figure 1:
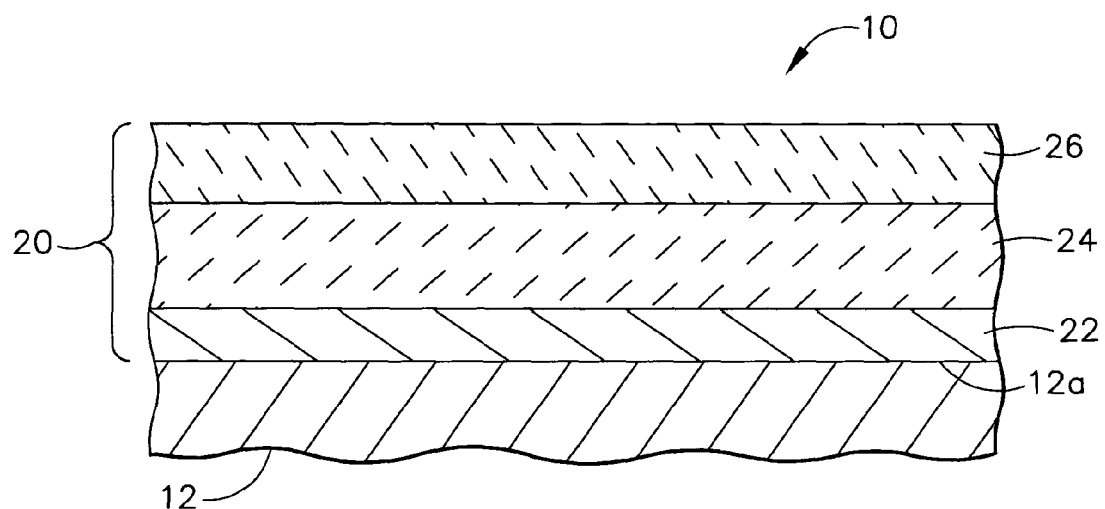
FIG. 1 shows a cross-sectional view of a portion of an article of manufacture, schematically representing a thermal barrier coating on a substrate, according to one embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides thermal barrier coating compositions, articles of manufacture, and methods for preparing thermal barrier coated components for advanced gas turbine engines. For example, the present invention generally provides a thermal barrier coating for gas turbine components, such as combustors, liners, shrouds, and airfoils. Thermal barrier coatings of the invention have a columnar microstructure comprising at least one segmented columnar ceramic layers, in which the hottest, outer columnar ceramic layer may comprise yttria stabilized hafnia, and a high melting temperature structure-stabilizing material deposited in segmentation gaps within the yttria stabilized hafnia layer. Such thermal barrier coatings maintain the integrity of segmentation gaps within the columnar ceramic layer(s) at higher operating temperatures, and extends the maximum surface temperature capability to at least about 3400° F. This is in contrast to conventional thermal barrier coatings having an outer layer of columnar yttria stabilized zirconia in which the integrity of segmentation gaps is lost at significantly lower temperatures.

Additionally, thermal barrier coatings of the invention may further include a relatively dense, non-segmented, outer sealant layer. Such a sealant layer prevents or inhibits penetration of molten glassy dust deposits and other contaminants into the first and second columnar layers of the thermal barrier coating. Glassy dust deposits and other contaminants may cause erosion, corrosion, and degradation of conventional thermal barrier coatings and underlying substrates in prior art gas turbine components. Still further, thermal barrier coatings of the invention exhibit increased stability which allows the formation of effusion holes through the coating and the underlying substrate by laser drilling without excessive interfacial cracking within the thermal barrier coating.

The first and second columnar ceramic layers of thermal barrier coatings of the invention may be applied by various deposition processes known in the art, e.g., electron beam physical vapor deposition (EB-PVD) or a plasma spray process, so as to have a columnar microstructure. Columns within the ceramic layers may be multi-grained (e.g., when deposited via a plasma spray process), or single grains (when deposited via EB-PVD). The columnar grains, or multi-grained columns, are typically oriented substantially orthogonal to the surface of the coated substrate. Segmentation gaps are interposed between the columns. The segmentation gaps may be in the submicron to micron size range, e.g., having a width in the range of from about 0.1 to 10 microns.

The presence of intercolumnar segmentation gaps reduces the effective modulus (increases compliance) of the first and second segmented columnar ceramic layers in the plane of the coating. Increased compliance provided by the segmentation gaps enhances coating durability by eliminating or minimizing stresses associated with thermal gradient and substrate/coating thermal expansion mismatch.

The integrity of the first and second columnar ceramic layers is maintained by a high melting temperature, particulate structure-stabilizing material deposited between adjacent columns. The structure-stabilizing material typically comprises second phase particles of a ceramic material that is chemically compatible with the first and second columnar ceramic layers. In one embodiment, the integrity of the first and second segmented columnar ceramic layers is further maintained by the presence of an outer, continuous, non-segmented ceramic sealant layer, which prevents entry of de-stabilizing extraneous materials.

With reference to the drawings, FIG. 1 is a cross-sectional view schematically representing a portion of an article of manufacture 10, according to one embodiment of the invention. As shown, article 10 includes a substrate 12, and a thermal barrier coating 20 disposed on substrate surface 12*a*. Substrate 12 may comprise a ceramic or a metal. Typically, substrate 12 is a superalloy, and often a nickel or cobalt based high temperature superalloy. As an example, substrate 12 may be a superalloy having a composition as disclosed in commonly assigned U.S. Pat. Nos. 6,103,386 and 6,482,537, the disclosures of which are incorporated by reference herein in their entirety.

Thermal barrier coating 20 comprises a bond coating layer 22 disposed on substrate 12. In the case of a ceramic substrate 12, bond coating layer 22 may itself comprise a ceramic. In the case of a metal substrate 12, e.g., a Ni based superalloy substrate, bond coating layer 22 may comprise a MCrAlY alloy, wherein M is at least one of cobalt and nickel. Such alloys typically include from about 10 to 35% chromium, 5 to 15% aluminum, and 0.01 to 1% yttrium, or hafnium, or lanthanum. MCrAlY alloys are known in the prior art, as described, for example, in U.S. Pat. No. 4,880,614, the disclosure of which is incorporated by reference herein in its entirety.

A bond coating layer 22 comprising a MCrAlY alloy may be applied by various deposition processes known in the art, e.g., by EB-PVD, plasma spraying, and the like. Alternatively, bond coating layer 22 may comprise an intermetallic aluminide, as described in commonly assigned U.S. Pat. Nos. 5,238,752 and U.S. Pat. No. 5,514,482, the disclosures of which are incorporated by reference herein in their entirety. Bond coating layer 22 typically has a thickness in the range of from about 0.5 to 20 mils, usually from about 1 to 15 mils, and often from about 2 to 7 mils. In some embodiments, a bond coating layer may be designed to thermally grow an adherent protective oxide scale, which is predominately alumina (see, for example, U.S. Pat. No. 6,482,537, the disclosure of which is incorporated by reference herein in its entirety). Such oxide scale is not shown in the drawings herein for the sake of clarity. The thermally grown oxide scale is chemically compatible with stabilized zirconia. Thermally grown oxide scale at a zirconia-bond coating interface typically nucleates to a sub-micron thickness during deposition of ceramic layers thereon and any post-coating heat treatment. Thereafter, the oxide scale typically grows to a thickness of a few microns during component service.

Thermal barrier coating 20 further comprises a first segmented columnar ceramic layer 24 disposed on bond coating layer 22. First segmented columnar ceramic layer 24 is typically in the form of a plurality of substantially parallel columns 32 arranged approximately orthogonal to the surface of substrate 12, and having a plurality of segmentation gaps 30 arranged substantially parallel to, and interposed between, adjacent columns 32 (see, e.g., FIGS. 2–4). Segmentation gaps 30 and columns 32 are omitted from FIG. 1 for the sake of clarity.

First segmented columnar ceramic layer 24 may comprise stabilized zirconia. In one embodiment, first segmented columnar ceramic layer 24 comprises cubic yttria stabilized zirconia. The cubic yttria stabilized zirconia may comprise from about 7 to 50 mole % yttria and 50 to 93 mole % zirconia, usually from about 7 to 40 mole % yttria and 60 to 93 mole % zirconia, and often from about 10 to 40 mole % yttria and 60 to 90 mole % zirconia. In an alternative embodiment, first columnar ceramic layer 24 may comprise tetragonal yttria stabilized zirconia. The thickness of first columnar ceramic layer 24 is typically in the range of from about 5 to 60 mils, usually from about 10 to 50 mils, and often from about 20 to 50 mils.

A number of deposition processes may be used to form first segmented columnar ceramic layer 24. The particular deposition process used to form first ceramic layer 24 may vary according to the particular component to be coated, and the desired thickness of layer 24. As an example, for coating relatively large components, such as combustors and liners, a plasma spray process may be used to provide a vertically segmented first segmented columnar ceramic layer 24 of yttria stabilized zirconia. Such a plasma spray process is described, for example, in U.S. Pat. No. 5,073,433, the disclosure of which is incorporated by reference herein in its entirety.

Alternatively, thick conventionally sprayed ceramic layers can be segmented using the method disclosed in U.S. Pat. No. 4,914,794, the disclosure of which is incorporated by reference herein in its entirety. As a further example, relatively thick compliant ceramic layers may be applied to various components, e.g., combustor or shroud segments, using an EB-PVD process. Such an EB-PVD process is described in U.S. Pat. No. 5,514,482, the disclosure of which is incorporated by reference herein in its entirety.

Again with reference to FIG. 1, thermal barrier coating 20 further includes a second segmented columnar ceramic layer 26 disposed on first columnar ceramic layer 24. Second ceramic layer 26 typically has a columnar microstructure having a plurality of columns oriented substantially orthogonal to the substrate surface 12a, similar to that described for first segmented columnar ceramic layer 24 (see, e.g., FIGS. 2–4). Typically, second segmented columnar ceramic layer 26 comprises stabilized hafnia. In one embodiment, second columnar ceramic layer 26 comprises cubic yttria stabilized hafnia comprising from about 12 to 50 mole % yttria, usually from about 15 to 50 mole % yttria, and often from about 18 to 40 mole % yttria. According to the invention, a combination of cubic yttria stabilized zirconia in first segmented columnar ceramic layer 24 and cubic yttria stabilized hafnia in second segmented columnar ceramic layer 26 provides a thermal barrier coating having a temperature capability of at least about 3400° F. In an alternative embodiment, second segmented columnar ceramic layer 26 may comprise tetragonal yttria stabilized hafnia, in which case first segmented columnar ceramic layer 24 typically comprises tetragonal yttria stabilized zirconia.

The thickness of second segmented columnar ceramic layer 26 may be less than that of first segmented columnar ceramic layer 24, typically being in the range of from about 5 to 50 mils, usually from about 5 to 40 mils, and often from about 5 to 30 mils. The respective thickness of first and second segmented columnar ceramic layers 24, 26 may be selected based on the temperature gradient through thermal barrier coatings 20/20'. For example, the thickness of second segmented columnar ceramic layer 26 may be selected such that the transition from cubic yttria stabilized hafnia to cubic yttria stabilized hafnia occurs at a design temperature of less than about 2900° F. Second segmented columnar ceramic layer 26 may be formed by various deposition processes known in the art, e.g., as described hereinabove with reference to deposition of first segmented columnar ceramic layer 24. First and second segmented columnar ceramic layers 24, 26 include a structure-stabilizing material (not shown in FIG. 1) disposed within segmentation gaps 30, as will be described hereinbelow, e.g., with reference to FIGS. 3–4.

Figure 2:
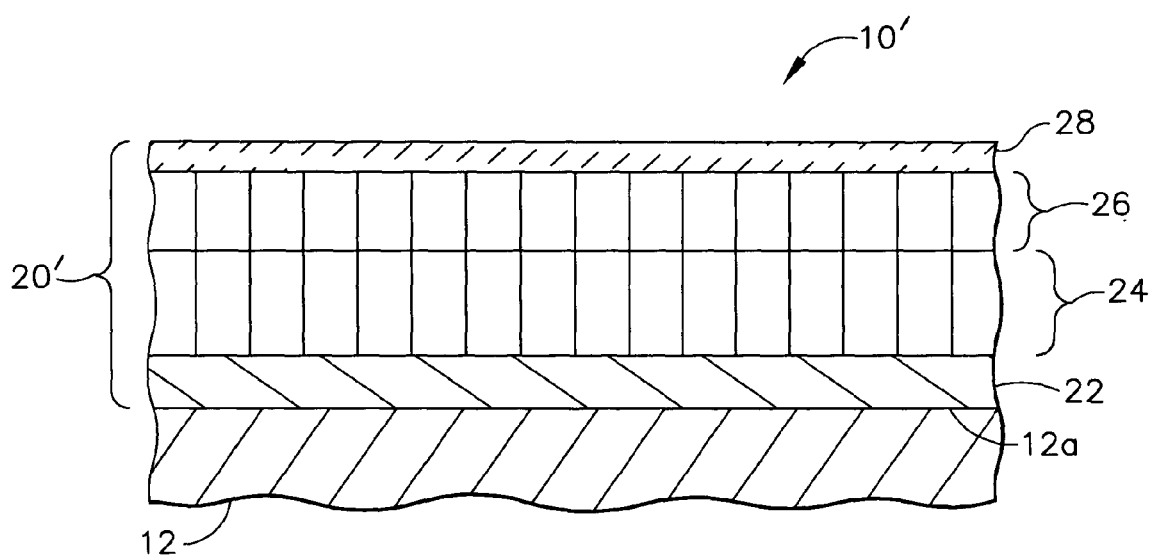
FIG. 2 shows a cross-sectional view of a portion of an article of manufacture, schematically representing a thermal barrier coating on a substrate, according to another embodiment of the invention.

FIG. 2 is a cross-sectional view of a portion of an article of manufacture 10', schematically representing a thermal barrier coating 20' on substrate 12, according to another embodiment of the invention. Thermal barrier coating 20' comprises a bond coating layer 22, a first segmented columnar ceramic layer 24 disposed on bond coating layer 22, and a second segmented columnar ceramic layer 26 disposed on first segmented columnar ceramic layer 24, essentially as described hereinabove with reference to FIG. 1. Segmentation gaps 30 may extend from the outer surface of second segmented columnar ceramic layer 26 toward bond coating layer 22 (see, e.g., FIG. 3A). In some embodiments, segmentation gaps 30 may terminate in the vicinity of bond coating layer 22, e.g., at a location within a few microns of bond coating layer 22. As described with reference to FIG. 1, a structure-stabilizing material (see, e.g., FIGS. 3A–B) may be disposed within segmentation gaps 30. The structure-stabilizing material is typically in the form of micron- or sub-micron-sized particles interposed or interspersed between adjacent columns of first and second segmented columnar ceramic layers 24, 26 (see, e.g., FIG. 3A).

Again with reference to FIG. 2, thermal barrier coating 20' further comprises an outer sealant layer 28 disposed on second segmented columnar ceramic layer 26, Sealant layer 28 may be a non-segmented ceramic layer deposited under conditions whereby few, if any, gaps are formed therein. As a result, sealant layer 28 forms a continuous coating on second segmented columnar ceramic layer 26, which seals thermal barrier coating 20' and prevents ingress or penetration of extraneous materials into segmentation gaps 30. This attribute of sealant layer 28 may assume particular importance during operation of land-based, marine, and low altitude aircraft gas turbine engines, i.e., in environments where glassy dust deposits, sodium salts, sulfates, and other contaminants are more likely to be ingested into gas turbine engines and form deposits on coated engine components. Such deposits and contaminants may degrade the thermal barrier coating, and may erode or corrode the underlying substrate after penetrating the thermal barrier coating. At the high temperatures experienced by outer sealant layer 28, the silica constituent of glassy dust deposits on the surface of sealant layer 28 reacts with water vapor in combustion gases to form $Si(OH)_4$ which is evaporated. Similarly, high surface temperatures promote evaporation of salt deposits. In this way, thermal barrier coatings 20'/20" actually promote the elimination of harmful glassy dust and salt deposits.

Figure 3A:
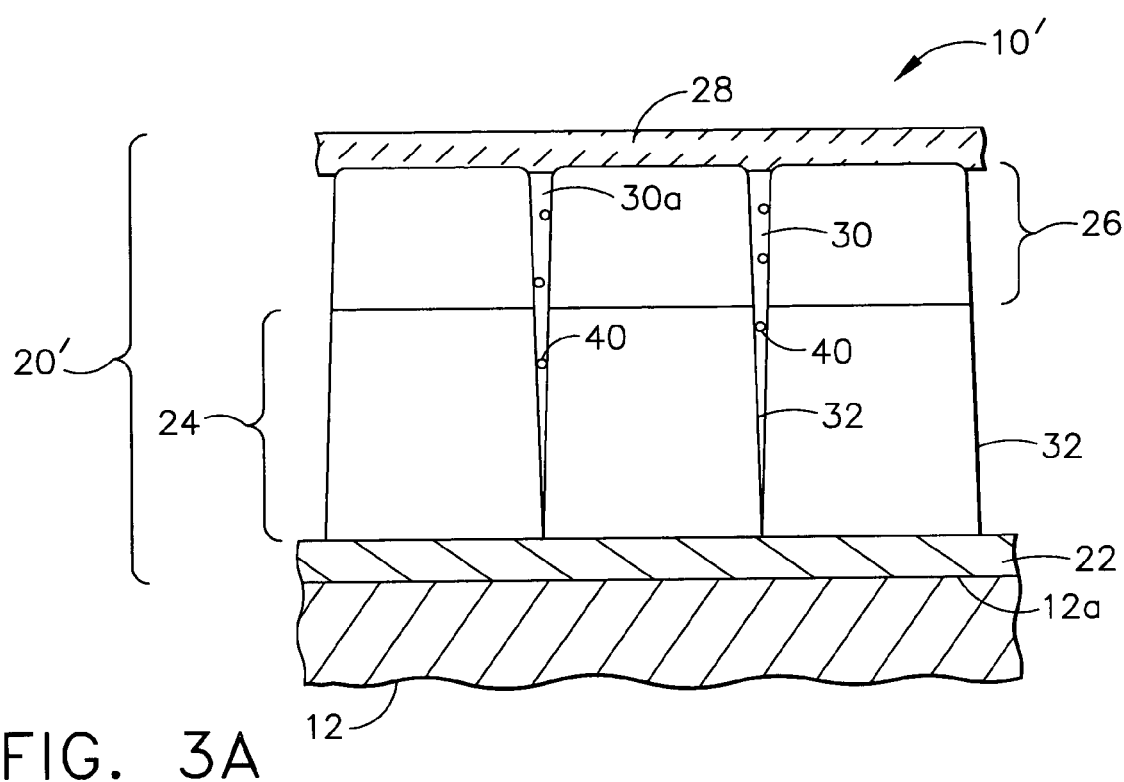
FIGS. 3A and 3B each show a cross-sectional view of a portion of an article of manufacture, schematically representing a thermal barrier coating having a columnar microstructure and a structure-stabilizing material disposed within segmentation gaps of the columnar microstructure, according to two different embodiments of the invention.

FIG. 3A is a cross-sectional view schematically representing a portion of an article of manufacture 10', showing an enlarged view of a thermal barrier coating 20' on a substrate 12, according to the invention. The components of thermal barrier coating 20', including bond coating layer 22, first and second segmented columnar ceramic layers 24, 26, and sealant layer 28 were described hereinabove. Although first and second segmented columnar ceramic layers 24, 26 are shown as having a discrete interface, it is to be understood that a compositionally graded interface is also contemplated under the invention. That is to say, a first columnar ceramic layer may transition to a second columnar ceramic layer through a concentration gradient. For example, a first layer of stabilized zirconia may transition to a second layer of stabilized hafnia through a concentration gradient comprising a mixture of varying concentrations of stabilized zirconia and stabilized hafnia. Both plasma spray and EB-PVD deposition methods permit first and second segmented columnar ceramic layers 24, 26 of thermal barrier coating 20/20' to be deposited either separately as individual layers having a discrete interface, or with a compositionally graded interface. The combined thickness of first and second segmented columnar ceramic layers 24, 26 may vary according to the application and component to be coated. Generally, the combined thickness of first and second segmented columnar ceramic layers 24, 26 is typically in the range of from about 3 to 100 mils, usually about 5 to 80 mils, and often from about 10 to 60 mils. First and second segmented columnar ceramic layers 24, 26 include a plurality of columns 32. As shown, columns 32 are substantially parallel to each other and orthogonal to substrate surface 12a. Segmentation gaps 30 extend between adjacent columns 32. Particles of a structure-stabilizing material 40 are disposed within segmentation gaps 30. Particles of structure-stabilizing material 40 may have a diameter in the range of from about 0.1 to 5 microns, usually from about 0.1 to 2 microns, and often from about 0.2 to 1 microns.

Particles of structure-stabilizing material 40 prevent sintering of columns 32 and maintain the integrity of first and second segmented columnar ceramic layers 24, 26. The compliance of thermal barrier coatings 20, 20' is dependent on the integrity of the intercolumnar particles of structure-stabilizing material 40. Therefore, it is important that structure-stabilizing material 40 comprises a material that resists sintering, and is insoluble in, and does not melt into, first and second columnar ceramic layers 24, 26 at temperatures experienced by the respective layers of thermal barrier coating 20'. As an example, in the case of structure-stabilizing material 40 comprising an yttrium aluminum oxide, since second segmented columnar ceramic layer 26 experiences a higher operating temperature than first segmented columnar ceramic layer 24, the composition and thickness of first and second segmented columnar ceramic layers 24, 26 may be selected such that the yttrium aluminum oxide does not dissolve in first and second segmented columnar ceramic layers 24, 26 at their respective operating temperatures. By selecting a suitable composition of cubic yttria stabilized hafnia for second segmented columnar ceramic layer 26, and an yttrium aluminum oxide as structure-stabilizing material 40, thermal barrier coating 20' can operate at a surface temperature of at least about 3400° F.

In some embodiments, structure-stabilizing material 40 may be deposited by infiltrating a sol gel solution into segmentation gaps 30, and thereafter reacting components of the sol gel solution to synthesize particles of structure-stabilizing material 40. Such sol gel deposition processes are described further hereinbelow, e.g., with reference to FIG. 4.

Again with reference to FIG. 3A, sealant layer 28 forms a continuous, non-segmented coat which effectively seals the outer end portions 30a of segmentation gaps 30, thereby preventing ingress of contaminating extraneous materials. Penetration of extraneous materials, such as glassy dust, sulfate salts, such as sodium sulfate, and the like, tends to reduce the compliance of columnar microstructures and to destabilize thermal barrier coatings of the prior art, leading to premature failure of prior art coatings. It is to be understood that FIG. 3A is a schematic representation of a thermal barrier coating of the invention, and the various components of FIG. 3A are not necessarily drawn to scale.

Figure 3B:
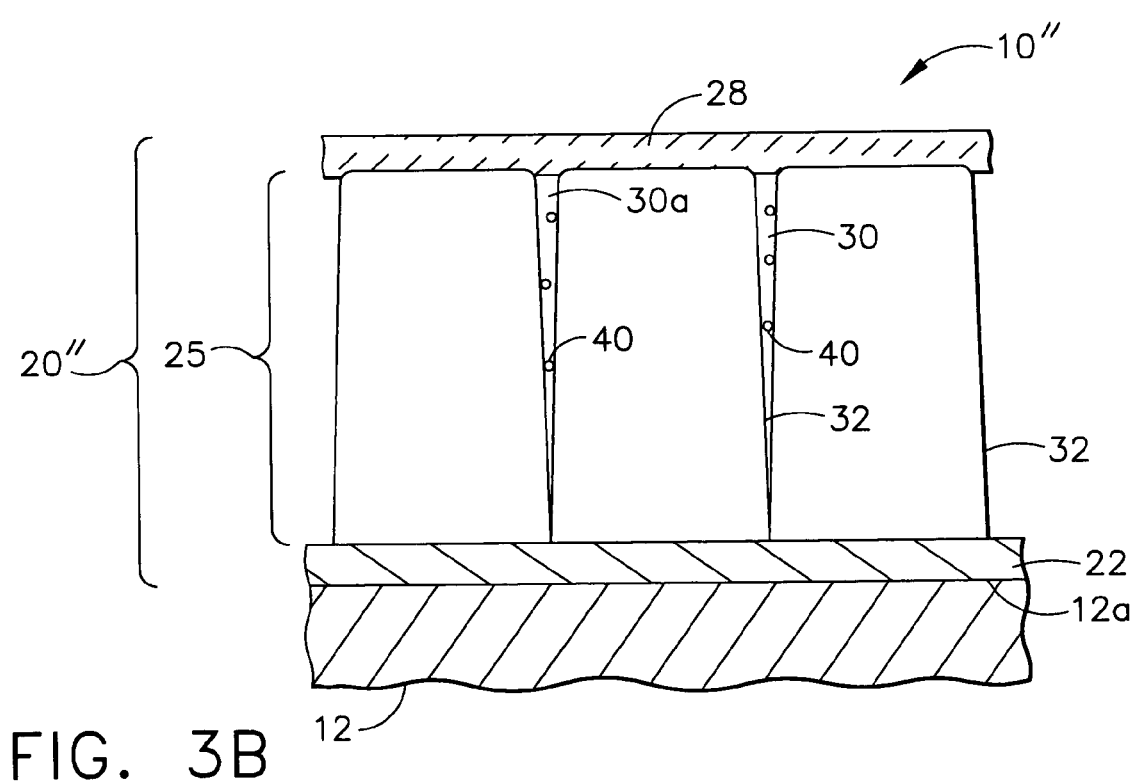

FIG. 3B is a cross-sectional view schematically representing a portion of an article of manufacture 10", showing an enlarged view of a thermal barrier coating 20" on a substrate 12, according to another embodiment of the invention. Thermal barrier coating 20" comprises a bond coating layer 22, and a single segmented columnar ceramic layer 25 disposed on bond coating layer 22. Segmentation gaps 30 extend from the outer surface of columnar ceramic layer 25 toward bond coating layer 22. Particles of a structure-stabilizing material 40 are disposed within segmentation gaps 30, essentially as described hereinabove, e.g., with reference to FIG. 3A. An outer sealant layer 28 of a continuous, non-segmented ceramic may be disposed on columnar ceramic layer 25. Sealant layer 28 may prevent ingress or penetration of extraneous materials into thermal barrier coating 20". Columnar ceramic layer 25 may comprise a suitable ceramic according to the intended application of thermal barrier coating 20". For example, for ultra-high temperature applications where weight is not an issue, columnar ceramic layer 25 may be cubic yttria stabilized hafnia. In another embodiment, for weight-limited or lower temperature applications, columnar ceramic layer 25 may be cubic yttria stabilized zirconia. Alternatively, columnar ceramic layer 25 may transition from stabilized zirconia to stabilized hafnia through a concentration gradient, as described hereinabove. The thickness of columnar ceramic layer 25 may be within the same, or a similar, range as that cited hereinabove with reference to FIG. 3A for the combined thickness of first and second columnar ceramic layers 24, 26, e.g., typically from about 3 to 100 mils.

Figure 4:
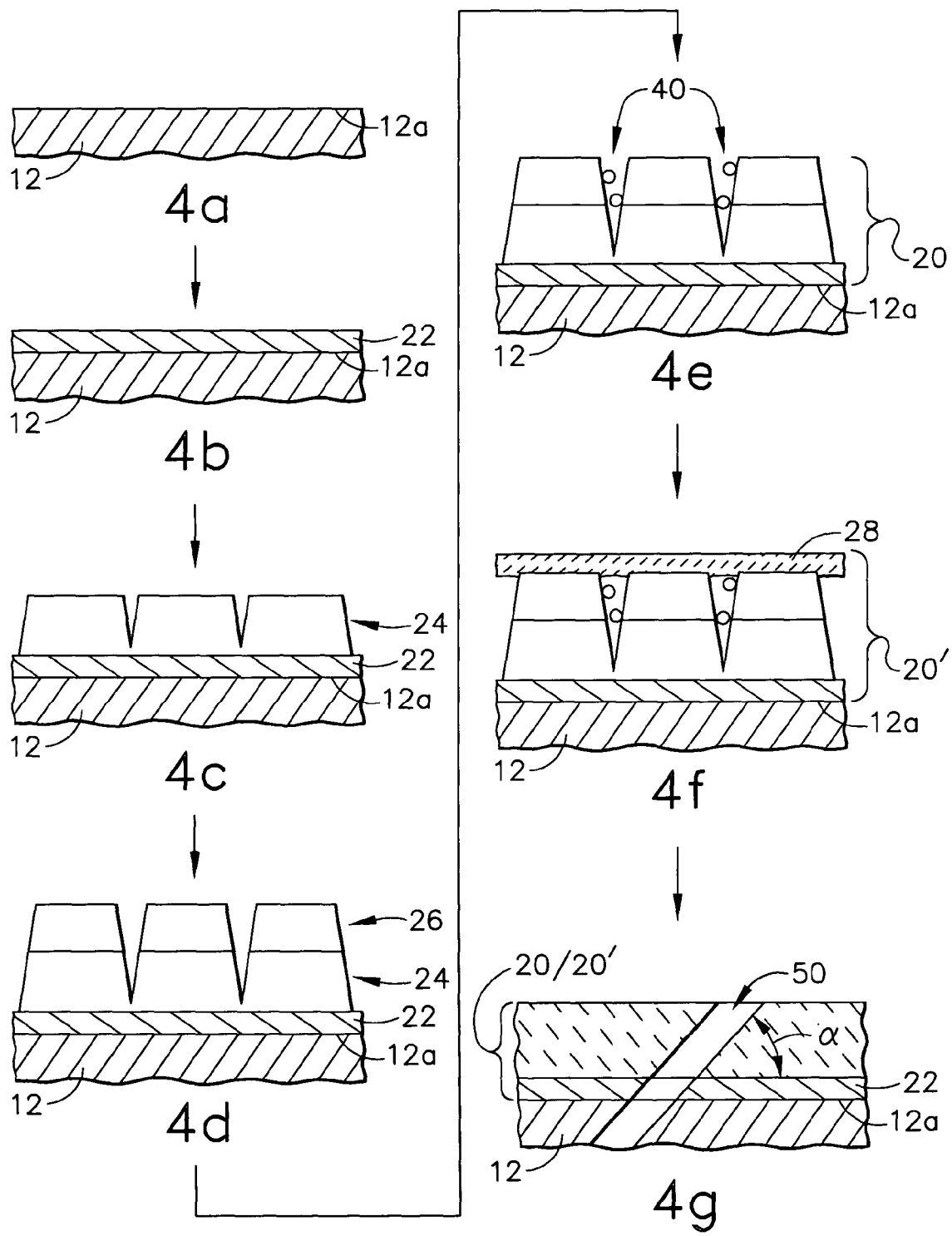
FIG. 4 schematically represents a series of steps involved in a method for preparing a thermal barrier coating on a substrate, according to another embodiment of the invention.

FIG. 4 schematically represents a series of steps involved in a method for preparing a thermal barrier coating on a substrate, according to one embodiment of the invention. Step 4a involves providing a substrate 12 having a substrate surface 12a to be coated with thermal barrier coating 20, 20'. As an example, substrate 12 may be a ceramic or a superalloy substrate, such as a Ni based superalloy. Step 4b involves depositing a bond coating layer 22 on substrate surface 12a. Bond coating layer 22, which may comprise an intermetallic aluminide or a MCrAlY alloy when the substrate is a superalloy, may be deposited using various deposition techniques, and to a suitable thickness, as described hereinabove.

Step 4c involves depositing a first segmented columnar ceramic layer 24 on bond coating layer 22. As shown, first segmented columnar ceramic layer 24 is in the form of a plurality of columns 32 having a plurality of segmentation gaps 30 interspersed or interposed therebetween. Typically, columns 32 are arranged or oriented substantially orthogonal to substrate surface 12a. First segmented columnar ceramic layer 24 may comprise an yttria stabilized zirconia. In one embodiment, first segmented columnar ceramic layer 24 comprises cubic yttria stabilized zirconia comprising from about 7 to 50 mole % yttria, usually from about 10 to 50 mole % yttria, and often from about 10 to 40 mole % yttria. First columnar ceramic layer 24 may be deposited using various deposition processes as described hereinabove. Typically, first columnar ceramic layer 24 may be deposited to a thickness in the range of from about 5 to 60 mils, usually from about 15 to 50 mils, and often from about 20 to 50 mils.

Step 4d involves depositing a second segmented columnar ceramic layer 26 on first segmented columnar ceramic layer 24. Second segmented columnar ceramic layer 26 is also in the form of a plurality of columns 32 having a plurality of segmentation gaps 30 interposed therebetween. Typically, columns 32 of second segmented columnar ceramic layer 26 are aligned with those of first segmented columnar ceramic layer 24. In this manner, segmentation gaps 30 within first and second segmented columnar ceramic layers 24, 26 are similarly aligned, and segmentation gaps 30 may extend the entire length, or almost the entire length, of columns 32. In an alternative embodiment, columns and segmentation gaps within first and second segmented columnar ceramic layers 24, 26 may be non-aligned.

Second segmented columnar ceramic layer 26 may comprise cubic yttria stabilized hafnia. Typically, second columnar ceramic layer 26 comprises from about 12 to 50 mole % yttria, usually from about 15 to 50 mole % yttria, and often from about 18 to 40 mole % yttria. Second columnar ceramic layer 26 may be deposited, using various deposition processes described hereinabove, to a thickness in the range of from about 5 to 50 mils, usually from about 5 to 40 mils, and often from about 5 to 30 mils.

Step 4e involves depositing a structure-stabilizing material 40 within segmentation gaps 30 of at least second columnar ceramic layer 26. More typically, step 4e involves depositing structure-stabilizing material 40 within segmentation gaps 30 of both first and second columnar ceramic layers 24, 26. In some embodiments, structure-stabilizing material 40 is deposited within segmentation gaps 30 as micron or sub-micron sized particles of a high melting temperature yttrium aluminum oxide (e.g., having a melting point of about 3468° F.).

In some embodiments, particles of structure-stabilizing material 40 are deposited within segmentation gaps 30 by infiltrating a sol gel solution into segmentation gaps 30. The sol gel solution may be infiltrated into segmentation gaps by, for example, spraying the outer surface of the incipient thermal barrier coating or by immersion in a sol gel bath. The sol gel solution may comprise a mixture of an alkoxide of yttrium and an alkoxide of aluminum in a suitable solvent, such as toluene or xylene. Such sol gel solutions may comprise from about 55 to 95% solvent, usually from about 60 to 90% solvent, and often from about 80 to 90% solvent, by weight/volume. A sol gel process for deposition of second phase particles is disclosed in commonly assigned U.S. Pat. No. 6,103,386, the disclosure of which is incorporated by reference herein in its entirety.

The composition and concentration of the sol gel solution may be varied to carefully control the viscosity of the solution. In order to promote facile infiltration of the sol gel solution into segmentation gaps 30, the viscosity of the sol gel solution is typically in the range of from about 1 to 100 centipoise, usually from about 1 to 50 centipoise, and often from about 1 to 10 centipoise. After sol gel infiltration of segmentation gaps 30, at least a portion of the solvent may be removed before subjecting the incipient thermal barrier coating, to heat treatment to polymerize or cross-link and densify the sol gel reaction products. Such heat treatment may be performed by thermal exposure during manufacture and/or during service. After evaporation of the liquid phase of the infiltrated sol gel, amorphous or metastable crystalline oxide particles, such as alumina and yttria, remain on internal surface of segmentation gaps 30. These deposited particles are subsequently crystallized to thermally stable phases following exposure to higher temperatures typically in excess of 500° C., e.g., during service conditions.

In one embodiment, structure-stabilizing material 40 comprises a reaction product of reactions between an alkoxide of yttrium and an alkoxide of aluminum, wherein the alkoxide of yttrium and the alkoxide of aluminum are applied to segmentation gaps 30 as a sol gel solution. In an alternative embodiment, structure-stabilizing material 40 may comprise a reaction product of reactions between a sol gel alkoxide of aluminum and one or more oxide components, e.g., yttria, of a columnar ceramic layer of the thermal barrier coating.

The reaction products synthesized within segmentation gaps 30 by the sol gel process may include at least one yttrium aluminum oxide, such as $YAlO_3$, $Y_3Al_5O_{12}$, and $Y_4Al_2O_9$. The yttrium aluminum oxide(s) are normally formed as micron or sub-micron sized particles which may be strongly bound to columns 32 of first and second columnar ceramic layers 24, 26 (e.g., FIGS. 3A–B). For example, the particles of structure-stabilizing material 40 may have a diameter in the range of from about 0.1 to 5 microns, usually from about 0.1 to 2 microns, and often from about 0.2 to 1 microns.

The reaction of the sol gel components to form structure-stabilizing material 40 may be controlled by adjusting the sol gel composition, and the heat treatment parameters, etc, in order to promote deposition of a suitable density (number of particles per unit area) and size of particulate structure-stabilizing material 40 within segmentation gaps 30. In some embodiments, sol gel infiltration and heat treatment may be sequentially repeated in order to increase the density of particulate structure-stabilizing material 40 within segmentation gaps 30.

Step 4f involves depositing a sealant layer 28 over second segmented columnar ceramic layer 26. Sealant layer 28 is typically a continuous, relatively dense layer of ceramic. i.e., a ceramic layer lacking a segmented columnar microstructure and having few, if any, gaps 30 therein. Sealant layer 28 may be deposited by a suitable deposition process, such as a plasma spray or EB-PVD process, under conditions inimical to the formation of a segmented columnar microstructure. Typically, sealant layer 28 is deposited on second segmented columnar ceramic layer 26 after deposition of structure-stabilizing material 40 within segmentation gaps 30. Sealant layer 28 may comprise cubic yttria stabilized hafnia or cubic yttria stabilized zirconia, and may have a thickness typically in the range of from about 0.5 to 10 mils, usually from about 0.5 to 7 mils, and often from about 0.5 to 5 mils. A primary function of sealant layer 28 is to prevent or delay penetration of potentially corrosive, erosive, or destabilizing extraneous material into thermal barrier coating 20'. Consequently, for certain applications in relatively clean environments, e.g., for high altitude use, sealant layer 28 may be omitted in some embodiments of the invention.

Figure 5:
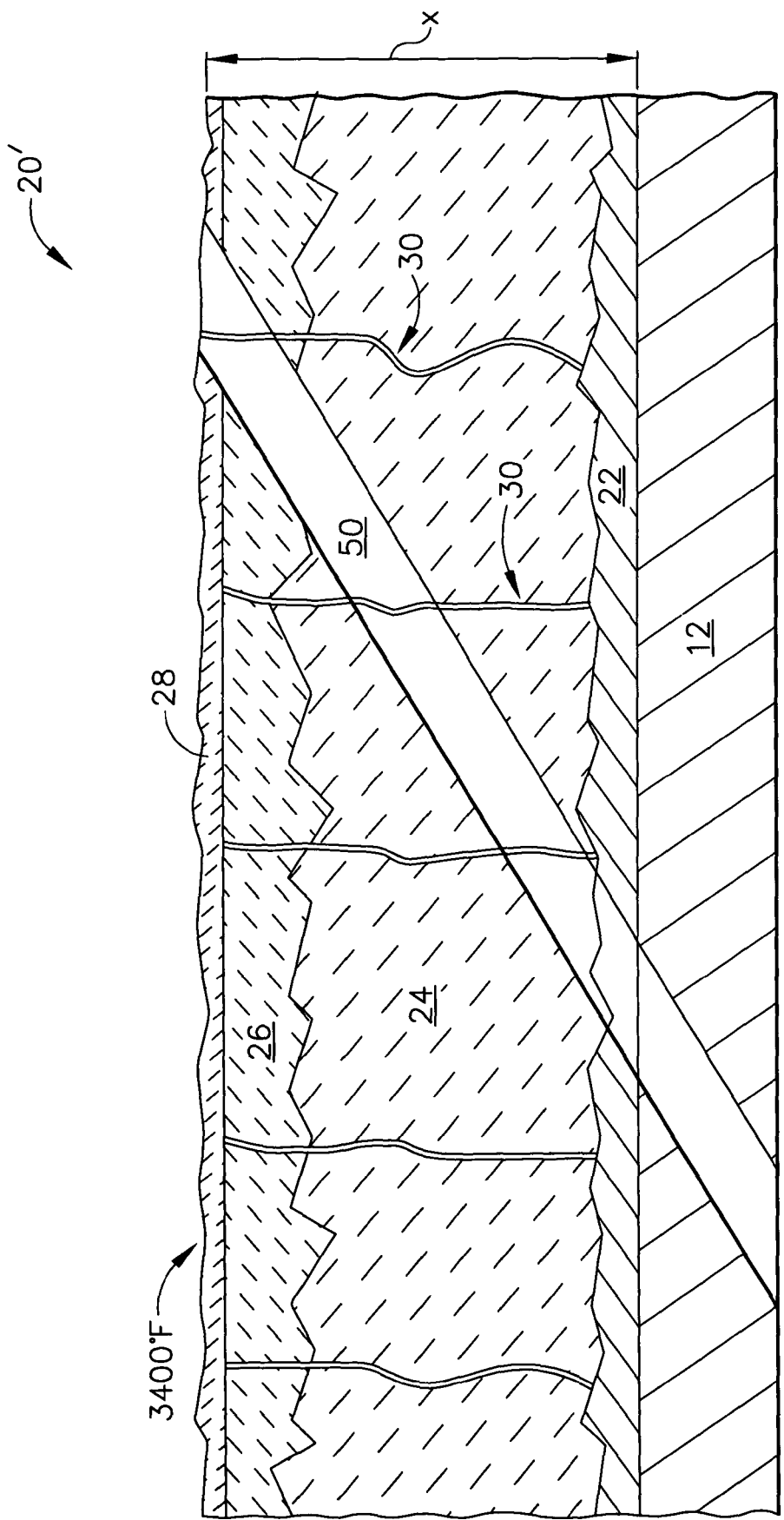
FIG. 5 is a cross-sectional view schematically representing a thermal barrier coating, according to one embodiment of the invention.

Optional step 4g involves forming one or more effusion holes 50 through thermal barrier coating 20' (see, e.g., FIG. 5).

FIG. 5 is a cross-sectional view schematically representing a thermal barrier coating 20' on a substrate 12, according to one embodiment of the invention. Thermal barrier coating 20' comprises a bond coating layer 22, a first segmented columnar ceramic layer 24, a second segmented columnar ceramic layer 26, and an outer sealant layer 28, essentially as described hereinabove, e.g., with reference to FIGS. 1–3. As shown, segmentation gaps 30 extend through first and second segmented columnar ceramic layers 24, 26. A structure-stabilizing material is typically disposed within segmentation gaps 30 between adjacent columns of first and second columnar ceramic layers 24, 26 (see, e.g., FIG. 3A). The total thickness, x of thermal barrier coating 20' is typically in the range of from about 3 to 120 mils, usually from about 10 to 80 mils, and often from about 10 to 60 mils.

A plurality of effusion holes 50 may be formed through thermal barrier coating 20'. Typically, effusion holes 50 are formed by a laser drilling process. Formation of effusion holes in thermal barrier coatings using lasers is known in the art. Advanced combustors having relatively thick thermal barrier coatings, e.g., in the range of from about 20 to 60 mils, may require effusion holes. However, the propensity for prior art thermal barrier coatings to experience interfacial cracking during effusion hole formation has severely limited the formation of effusion holes to a thickness of only about 10 to 20 mils. Without being bound by theory, applicant believes that the increased stability exhibited by thermal barrier coatings of the invention allows the formation of effusion holes through relatively thick thermal barrier coatings with no, or minimal, interfacial cracking at the interface of bond coating layer 22 and first columnar ceramic layer 24.

Although a single effusion hole 50 is shown in FIG. 5, in practice, a plurality of effusion holes 50 are typically distributed on the surface of thermal barrier coating 20', e.g., at a density of from about 10 to 100 holes per square inch, and often from about 20 to 50 holes per square inch. Typically, effusion holes 50 are formed at an angle, a (FIG. 4) of from about 10° to 30°, and often at an angle of about 20°, to substrate surface 12a.

It should be understood, of course, that the foregoing relates to preferred embodiments of the invention and that modifications may be made without departing from the spirit and scope of the invention as set forth in the following claims.

I claim:

1. A thermal barrier coating for coating a substrate, comprising:
   a bond coating layer disposed on a surface of said substrate;
   a segmented columnar ceramic layer disposed on said bond coating layer, said segmented columnar ceramic layer comprising a layer of stabilized zirconia disposed on said bond coating layer, a layer of stabilized hafnia disposed on said layer of stabilized zirconia, and a transition region between the layers of stabilized zirconia and the stabilized hafnia in which a stabilized zirconia concentration decreases and a stabilized hafnia concentration increases along a transition gradient, said ceramic layer having a plurality of adjacent columns formed substantially therethrough and a plurality of segmentation gaps between the adjacent columns; and
   a structure-stabilizing material disposed within said plurality of segmentation gaps between the adjacent columns.

2. The thermal barrier coating of claim 1, wherein said segmented columnar ceramic layer comprises a layer of yttria stabilized hafnia.

3. The thermal barrier coating of claim 1, wherein said structure-stabilizing material is a reaction product formed by reacting a first sol gel component with a second sol gel component.

4. The thermal barrier coating of claim 1, wherein said layer of stabilized hafnia includes a stabilizing oxide component and said structure-stabilizing material is a reaction product formed by reacting a sol gel component with said stabilizing oxide component.

5. The thermal barrier coating of claim 1, wherein said structure-stabilizing material comprises particles of an yttrium aluminum oxide.

6. The thermal barrier coating of claim 1, wherein said structure-stabilizing material is insoluble in said layer of stabilized hafnia at a temperature of at least about 3400° F.

7. The thermal barrier coating of claim 1, wherein said structure-stabilizing material is selected from the group consisting of $YAlO_3$, $Y_3Al_5O_{12}$, and $Y_4Al_2O_9$.

8. The thermal barrier coating of claim 1, further comprising a sealant layer disposed on said layer of stabilized hafnia, said sealant layer sealing said plurality of segmentation gaps.

9. The thermal barrier coating of claim 8, wherein said layer of stabilized hafnia comprises yttria stabilized hafnia.

10. The thermal barrier coating of claim 8, wherein said sealant layer comprises a continuous, non-segmented layer of cubic yttria stabilized hafnia or a continuous, non-segmented layer of cubic yttria stabilized zirconia.

11. The thermal barrier coating of claim 8, wherein said sealant layer has a thickness in the range of from about 0.5 to 10 mils.

12. The thermal barrier coating of claim 1, wherein said layer of stabilized hafnia comprises cubic yttria stabilized hafnia and has a thickness in the range of from about 10 to 60 mils.

13. The thermal barrier coating of claim 1, wherein said layer of stabilized zirconia comprises a layer of yttria stabilized zirconia, and said layer of stabilized hafnia comprises a layer of yttria stabilized hafnia.

14. A thermal barrier coating for coating a substrate, comprising:
- a bond coating layer disposed on a surface of said substrate;
- a first segmented columnar ceramic layer comprising yttria stabilized zirconia disposed on said bond coating layer;
- a second segmented columnar ceramic layer comprising yttria stabilized hafnia disposed on said first segmented columnar ceramic layer, each of said first segmented columnar ceramic layer and said second segmented columnar ceramic layer having a plurality of segmentation gaps therein;
- a transition region between the layers of the yttria stabilized zirconia and the yttria stabilized hafnia in which a stabilized zirconia concentration decreases and a stabilized hafnia concentration increases along a transition gradient;
- a structure-stabilizing material disposed within said plurality of segmentation gaps, wherein said structure-stabilizing material stabilizes said first segmented columnar ceramic layer and said second segmented columnar ceramic layer, and
- an outer sealant layer disposed on said second segmented columnar ceramic layer, said outer sealant layer comprising a continuous, non-segmented ceramic layer, and said outer sealant layer sealing said plurality of segmentation gaps within said second segmented columnar ceramic layer.

15. The thermal barrier coating of claim 14, wherein said plurality of segmentation gaps within said first segmented columnar ceramic layer are substantially aligned with said plurality of segmentation gaps within said second segmented columnar ceramic layer.

16. The thermal barrier coating of claim 15, wherein said structure-stabilizing material is insoluble in said second segmented columnar ceramic layer when said second segmented columnar ceramic layer is exposed to a temperature of about 3400° F.

17. The thermal barrier coating of claim 14, wherein said first segmented columnar ceramic layer comprises cubic yttria stabilized zirconia,, and said second segmented columnar ceramic layer comprises cubic yttria stabilized hafnia.

18. The thermal barrier coating of claim 17, wherein the thickness of said second segmented columnar ceramic layer is selected such that a temperature gradient transition within said thermal barrier coating from said cubic yttria stabilized zirconia to said cubic yttria stabilized hafnia occurs at a temperature of less than about 2900° F.

19. A thermal barrier coating for coating a substrate, comprising:
- a bond coating layer disposed on a surface of said substrate;
- a layer of cubic yttria stabilized zirconia disposed on said bond coating layer, said layer of cubic yttria stabilized zirconia comprising from about 7 to 40 mole % yttria and from about 60 to 93 mole % zirconia, and having a thickness in the range of from about 5 to 60 mils;
- a layer of cubic yttria stabilized hafnia disposed on said layer of cubic yttria stabilized zirconia, said layer of cubic yttria stabilized hafnia being thinner than the layer of cubic yttria stabilized zirconia and having a thickness in the range of from about 5 to 50 mils, each of said layer of cubic yttria stabilized hafnia and said layer of cubic yttria stabilized zirconia having a columnar microstructure and a plurality of segmentation gaps within said columnar microstructure, said plurality of segmentation gaps oriented substantially orthogonal to said surface of said substrate;
- a structure-stabilizing material disposed within said plurality of segmentation gaps in the layers of cubic yttria stabilized zirconia and cubic yttria stabilized hafnia, said structure-stabilizing material comprising particles of an yttrium aluminum oxide, said particles having a diameter in the range of from about 0.1 to 2 microns; and
- an outer sealant layer disposed on said layer of cubic yttria stabilized hafnia, said outer sealant layer comprising a continuous, non-segmented coating on said columnar microstructure, and said outer sealant layer sealing said plurality of segmentation gaps within said layer of cubic yttria stabilized hafnia, said outer sealant layer comprising a material selected from the group consisting of cubic yttria stabilized zirconia and cubic yttria stabilized hafnia.

20. In a thermal barrier coating including a bond coating layer, a first segmented columnar ceramic layer on the bond coating layer, and a structure-stabilizing material interposed between columns of said first segmented columnar ceramic layer, the improvement which comprises:
- a second segmented columnar ceramic layer disposed on said first segmented columnar ceramic layer, said second segmented columnar ceramic layer being thinner than the first segmented columnar ceramic layer and comprising yttria stabilized hafnia, wherein said structure-stabilizing material is also interposed between columns of the second segmented columnar layer and is insoluble therein at a temperature of at least about 3400° F.

21. The thermal barrier coating of claim 20, wherein said second segmented columnar ceramic layer and said first segmented columnar ceramic layer resist sintering when an outer surface of said thermal barrier coating is exposed to a temperature of at least about 3400° F.

22. The thermal barrier coating of claim 20, wherein said second segmented columnar ceramic layer comprises cubic yttria stabilized hafnia and said first segmented columnar ceramic layer comprises cubic yttria stabilized zirconia.

23. The thermal barrier coating of claim 20, further comprising a continuous, non-segmented ceramic sealant layer disposed on said second segmented columnar ceramic layer, wherein said sealant layer comprises a material selected from the group consisting of cubic stabilized zirconia and cubic stabilized hafnia.

24. The thermal barrier coating of claim 23, wherein said sealant layer comprises a material selected from the group consisting of cubic yttria stabilized zirconia and cubic yttria stabilized hafnia.

25. The thermal barrier coating of claim 20, wherein said sealant layer prevents penetration of glassy dust or salt deposits into said thermal barrier coating, and said thermal barrier coating promotes the elimination of glassy dust and salt deposits from said thermal barrier coating.

26. An article of manufacture for a gas turbine engine, comprising:
- a superalloy substrate;
- a bond coating layer disposed on said substrate;
- a first segmented columnar ceramic layer comprising yttria stabilized zirconia disposed on said bond coating layer;
- a second segmented columnar ceramic layer comprising yttria stabilized hafnia disposed on said first segmented columnar ceramic layer, each of said first segmented columnar ceramic layer and said second segmented columnar ceramic layer having a plurality of segmentation gaps therein, said plurality of segmentation gaps interspersed with and defining a plurality of columns within said first and second segmented columnar ceramic layers;
a transition region, between the first and second segmented columnar ceramic layers, in which stabilized zirconia concentration decreases and a stabilized hafnia concentration increases along a transition gradient;
a structure-stabilizing material disposed within said plurality of segmentation gaps, wherein said structure-stabilizing material maintains the integrity of said plurality of columns within said first segmented columnar ceramic layer and said second segmented columnar ceramic layer; and
an outer, continuous, non-segmented sealant layer disposed on said second segmented columnar ceramic layer, said sealant layer preventing penetration of extraneous materials into said plurality of segmentation gaps.

27. The article of manufacture of claim 26, wherein said structure-stabilizing material comprises particles of an yttrium aluminum oxide, said particles interposed between adjacent members of said plurality of columns, said particles having a diameter in the range of from about 0.1 to 2 microns.

28. The article of manufacture of claim 26, wherein said bond coating layer is selected from the group consisting of an aluminide and a MCrAlY, wherein M is a metal selected from the group consisting of nickel, cobalt, and mixtures thereof.

* * * * *